United States Patent [19]

Ackley et al.

[11] Patent Number: 4,543,112
[45] Date of Patent: Sep. 24, 1985

[54] SORBENT TYPE FILTER ASSEMBLY FOR A RESPIRATOR AND METHOD OF MAKING SAME

[75] Inventors: Mark W. Ackley, E. Aurora; Brian D. Szafranski, Lancaster, both of N.Y.

[73] Assignee: Figgie International Inc., Willoughby, Ohio

[21] Appl. No.: 605,588

[22] Filed: Apr. 30, 1984

[51] Int. Cl.[4] .......................................... B01D 53/04
[52] U.S. Cl. ........................................ 55/316; 29/422; 29/511; 55/387; 55/420; 55/502; 55/509; 55/518; 55/DIG. 33; 128/205.27; 128/206.15
[58] Field of Search .................... 29/422, 510, 511; 55/316, 387, 389, 420, 475, 502, 507, 509, 518, 519, DIG. 33; 128/205.27, 205.28, 205.29, 206.15, 206.17; 210/350, 351, 445, 446, 450, 451

[56] References Cited

U.S. PATENT DOCUMENTS

| 965,451 | 7/1910 | Gledhill et al. ............... 210/445 X |
| 1,596,060 | 8/1926 | Mase .................................. 55/316 |
| 1,737,532 | 11/1929 | Allen ................................ 55/387 |
| 1,789,262 | 1/1931 | Monro et al. ................... 55/316 X |
| 2,345,530 | 3/1944 | Connell .......................... 55/387 X |
| 2,406,368 | 8/1946 | Gross ................................ 55/316 |
| 2,442,356 | 6/1948 | Gross ............................ 55/316 X |
| 2,537,992 | 1/1951 | Gross et al. .................... 55/387 X |
| 2,548,168 | 4/1951 | Luce ................................ 55/387 X |
| 2,577,606 | 12/1951 | Conley .......................... 55/316 X |
| 2,593,132 | 4/1952 | Gannon .......................... 55/509 X |
| 2,614,650 | 10/1952 | Chandler et al. ............... 55/387 X |
| 2,621,753 | 12/1952 | Urdahl ............................ 55/387 X |
| 2,630,227 | 3/1953 | Rodwell ....................... 210/451 X |
| 2,652,828 | 9/1953 | Matheson ................. 128/206.15 X |
| 2,664,887 | 1/1954 | Green ............................ 128/206.17 |
| 2,671,528 | 3/1954 | Gross ................................ 55/316 |
| 2,682,315 | 6/1954 | Evans .......................... 55/514 X |
| 2,744,523 | 5/1956 | Malcom, Jr. et al. ......... 55/316 X |
| 2,744,525 | 5/1956 | Whipple .................. 128/206.17 X |
| 2,764,251 | 9/1956 | Jessop ............................ 55/316 |
| 2,787,333 | 4/1957 | Boone et al. .................... 55/316 |
| 2,818,178 | 12/1957 | Hodsdon ....................... 210/445 |
| 2,825,424 | 3/1958 | Gross ................................ 55/316 |
| 2,931,507 | 4/1960 | Kent .............................. 210/445 |
| 2,951,551 | 9/1960 | West ................................ 55/316 |
| 3,029,581 | 4/1962 | Robbins .......................... 55/316 |
| 3,072,119 | 1/1963 | Matheson ................... 128/206.17 |
| 3,136,617 | 6/1964 | Wachter .......................... 55/519 |
| 3,342,366 | 9/1967 | Defauw ...................... 29/510 X |
| 3,347,387 | 10/1967 | Balogh ....................... 210/352 X |
| 3,348,692 | 10/1967 | Balogh ....................... 210/352 X |
| 3,615,233 | 10/1971 | Doering et al. ............... 55/387 X |
| 3,658,183 | 4/1972 | Best et al. ....................... 210/446 |
| 3,680,707 | 8/1972 | Zeek ........................... 210/352 X |
| 3,803,817 | 4/1974 | Lewis ..................... 128/205.29 X |
| 3,929,648 | 12/1975 | Cuthbert ....................... 210/445 |
| 3,941,573 | 3/1976 | Chapel ............................ 55/316 |
| 3,944,403 | 3/1976 | Simpson et al. ............... 55/316 |
| 4,056,876 | 11/1977 | Lämmermann ............. 55/514 X |
| 4,352,231 | 10/1982 | Jacobellis ..................... 29/511 X |
| 4,400,864 | 8/1983 | Peyton et al. ............... 210/232 X |

FOREIGN PATENT DOCUMENTS

| 703478 | 3/1941 | Fed. Rep. of Germany ........ 55/509 |
| 2623793 | 12/1976 | Fed. Rep. of Germany ................. 128/206.17 |
| 80721 | 3/1956 | Netherlands .......................... 55/519 |
| 959508 | 6/1964 | United Kingdom ........... 128/205.28 |

OTHER PUBLICATIONS

Investigation of Toxic Gases from Mexican and other High Sulphur Petroleums and Products, Report by the Bureau of Mines, Department of the Interior–1925.
The Development of Low-Resistance Lightweight Gas Mask Canisters, The Naval Research Laboratory–Jun. 1, 1959, Under Authorization NRL Problem C08-22, Project NS 097-001.

Primary Examiner—Robert Spitzer
Attorney, Agent, or Firm—Christel, Bean & Linihan

[57] ABSTRACT

A sorbent type filter assembly (10) which is made by sequentially placing a first resilient perforated plate (40), a first retention filter (36), a sorbent bed (34), a second retention filter (38), a second resilient perforated plate (42), and a cover (14) within the cylindrical portion (16) of a canister shell (12). The cover (14) is forced downwardly to compress the sorbent bed (34) and to resiliently spring bias or stress the first resilient perforated plate (40). While the parts are held together under compression, an annular edge portion of the cylindrical shell is rolled into a circumferentially extending groove on the canister cover to hermetically and mechanically hold the parts together in their assembled and compressed relationship.

16 Claims, 7 Drawing Figures

SORBENT TYPE FILTER ASSEMBLY FOR A RESPIRATOR AND METHOD OF MAKING SAME

TECHNICAL FIELD

The present invention relates generally to filter assemblies, and more particularly to a sorbent type filter assembly for a respirator and a method of making the filter assembly.

BACKGROUND OF THE INVENTION

Sorbent type filter assemblies for respirators are well known in the art. The filter assemblies customarily have a sorbent bed formed from a granular material which could be, for example, activated charcoal. In order to prevent the sorbent bed from shifting during use, which shifting could lead to early breakthrough of noxious gases, it is customary to maintain the sorbent bed under compression. In a typical application this is achieved by providing a spring which is biased against a perforated plate or screen to hold the perforated plate or screen against a retention filter which is in turn biased into contact with the sorbent bed on one side, the other side of the sorbent bed also being retained by a retention filter and perforated plate or screen.

Sorbent bed filters may also be associated with particulate filters for filtering out airborne particles.

OBJECTS OF THE INVENTION

It is an object of the present invention to provide a novel sorbent type filter assembly having a minimum number of parts and which can be handled in a normal manner without undue damage to the filter assembly.

More particularly, it is an object of the present invention to provide a sorbent type filter assembly which includes a sorbent bed disposed within the cylindrical portion of a canister shell, the sorbent bed being maintained under compression by retention means which includes a resiliently stressed perforated plate.

It is another object of the present invention to provide a method for assembling a sorbent type filter assembly. The method includes the steps of sequentially placing a first resilient perforated plate, a first retention filter, a sorbent bed, a second retention filter, a second resilient perforated plate and a cover within the cylindrical portion of a canister shell. The cover is forced downwardly to compress the sorbent bed and to resiliently spring bias or stress the first resilient perforated plate. While the parts are held together under compression, an annular edge portion of the cylindrical shell is rolled into a circumferentially extending groove on the canister cover to hermetically and mechanically hold the parts together in their assembled and compressed relationship.

The foregoing objects and other objects and advantages of this invention will become more apparent after a consideration of the following detailed description taken in conjunction with the accompanying drawings in which one of the preferred forms of this invention is illustrated.

DETAILED DESCRIPTION

Figure 2:
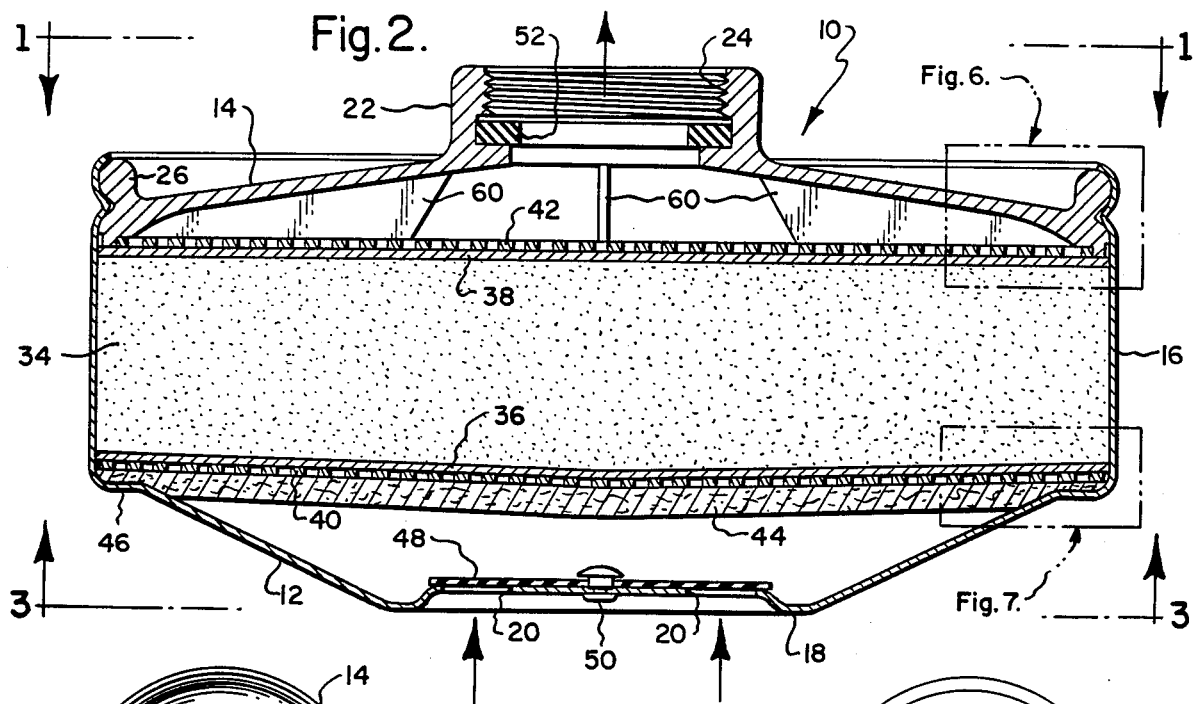
FIG. 2 is a sectional view taken generally along the lines 2—2 of FIG. 1.
Figure 1:
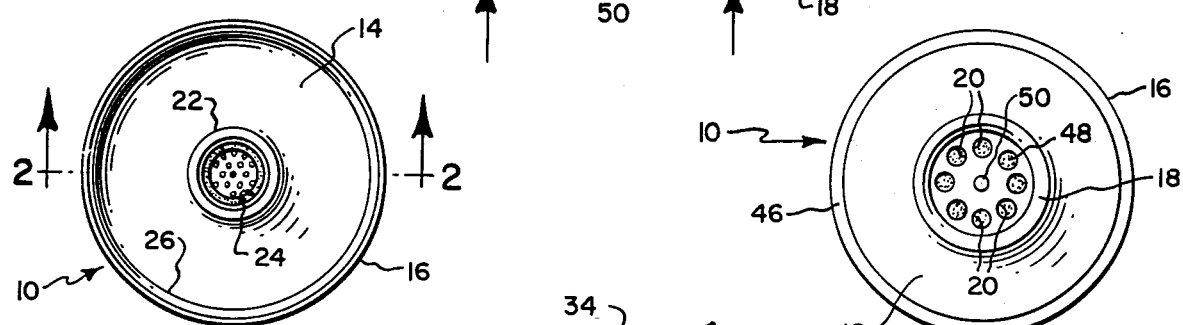
FIG. 1 is an end view of a sorbent type filter assembly of this invention.
Figure 3:
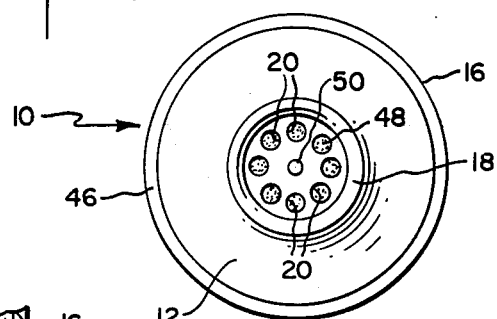
FIG. 3 is the other end view of the filter assembly shown in FIGS. 1 and 2.
Figure 4:
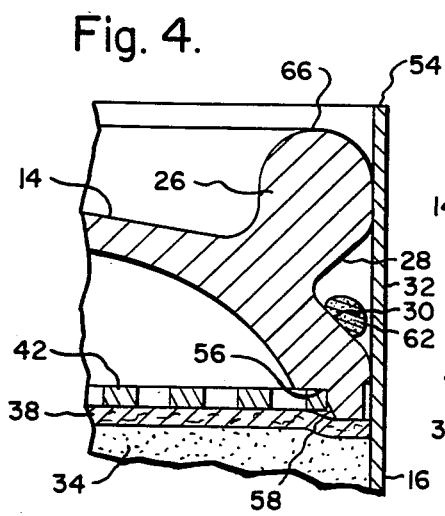
FIGS. 4, 5, and 6 illustrate sequentially a portion of the method of assembling the filter assembly shown in FIGS. 1, 2, and 3, FIG. 6 corresponding to the section indicated in FIG. 2.

Referring first to FIG. 2, a cross section of a sorbent type filter assembly is illustrated, the assembly being indicated generally at 10. The filter assembly is formed from two exterior components which are a canister shell 12, formed from drawn aluminum or the like, and a canister cover 14, which is formed of a suitable injection moldable plastic. The plastic should have good dimensional stability, creep resistance, resistance to various chemicals, and good thermal characteristics. Examples of such plastics are certain types of ABS and polyphenylene oxides. The canister shell is provided with a generally cylindrical portion 16 and an end portion 18 provided with a passageway therein, which passageway may be in the form of a plurality of equally spaced apart relatively small apertures 20. The canister cover includes an integrally formed central fitting 22 provided with internal threads 24, the fitting providing a passageway for the egress of purified air from the canister. The canister cover is further provided with an axially extending peripheral portion 26. The peripheral portion is provided with a circumferentially extending V-shaped groove, best shown in FIG. 4, the V-shaped groove being provided with upper and lower ramp surfaces 28, 30, respectively. The parts are secured together by forming an annular edge portion 32 of the cylindrical portion 16 of the canister shell 12 into the V-shaped groove in a manner which will be more fully described below.

Figure 7:
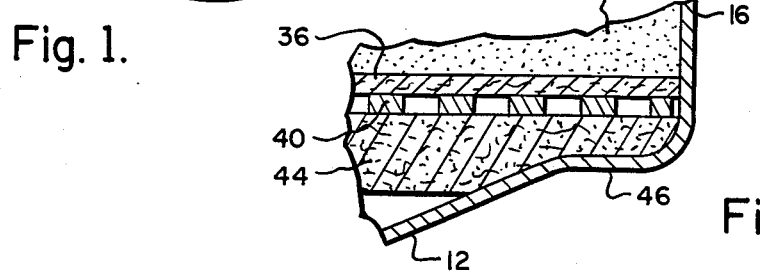
FIG. 7 is an enlarged detail view of a portion of FIG. 2 as indicated in the drawings.

The filter assembly further includes a sorbent bed 34 which can be any one of a number of suitable compounds which are selected for filtering out various vapors and gases, one common form of sorbent bed being activated charcoal granules. Because the sorbent bed is of a granular material, it is necessary to maintain it between retention means. In the embodiment illustrated, the retention means includes a pair of oppositely disposed first and second retention filters 36, 38 respectively, and a pair of oppositely disposed first and second resilient perforated plates 40, 42, respectively. These plates, which may be formed from aluminum, are maintained in intimate contact with the retention filters and maintain the sorbent bed in a compressed state therebetween. The assembly may additionally include a particulate filter, and one such filter is indicated at 44 in FIGS. 2 and 7. It should be noted, however, that in some filter designs there may be no requirement for a particulate filter, and thus the particulate filter may be eliminated. In the design illustrated, when a particulate filter is employed, the periphery of the particulate filter will bear against the step 46 which is formed between the cylindrical portion 16 of the shell and its end portion 18. If no particulate filter is employed, the periphery of the first resilient perforated plate will bear against such step. An inhalation valve 48 may be also provided, the inhalation valve laying over the apertures 20 and being secured in place by a rivet 50. Finally, the filter assembly may be provided with a gasket 52 which is disposed within the central fitting 22 for insuring a proper seal between the fitting 22 and an inlet fitting on a respiratory device to which the central fitting may be secured.

Figure 5:
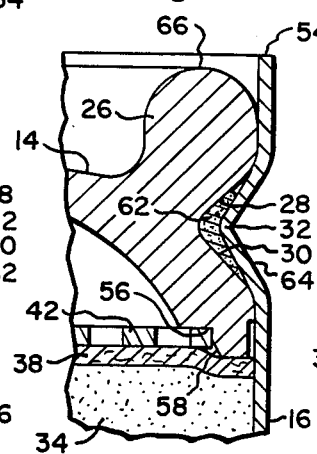
Figure 6:
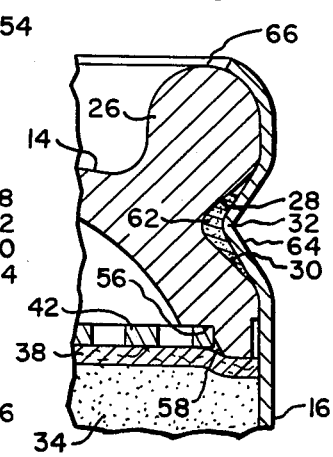

It should be appreciated that in the operation of such a filter it is desirable that no noxious gases bypass the seam between the canister cover and the canister shell. It is also important that the sorbent bed 34 be maintained under compression to prevent it from shifting, which shifting could lead to an early breakthrough of noxious gases. Additionally, the filter should be capable of working in a wide variety of temperatures and to withstand temperature ranges from below 0° F. to well above 100°F., the thermal expansion and contraction not damaging the seam between the canister shell and the canister cover. It is also desirable that a minimal number of parts be employed in the construction to simplify the design of the filter assembly and to improve its reliability. These objectives have been achieved through applicant's novel design and method of assembly. Thus, when the parts are to be assembled, the canister shell is initially positioned so that the generally cylindrical portion 16 extends upwardly to its terminal edge 54, the portion initially being free of any indentations. This will permit the various parts to be assembled within the canister. The second resilient plate 42 is initially incorporated into the cover 14. This has been accomplished by providing an internal annular groove 56 within the peripheral portion 26, the second resilient perforated plate 42 being so sized that it can be force fit into the annular groove 56. To this end, it should be noted that the groove 56 is provided with a tapered leading surface 58 to facilitate the insertion of the plate 42 into the groove. The canister cover 14 is also provided with four equally spaced apart ribs 60, the lower surfaces of which lie in a plane which correspond to the planar surface of the groove 56 so that when the plate 42 is assembled within the cover, it is maintained in a planar condition. After the cover and perforated plate subassembly has been completed, it may be inserted into the canister shell. However, it is first necessary to assemble the particulate filter 44, if one is to be used, the first resilient perforated plate 40, the first retention filter 36, and the bed of sorbent material 34 into the canister shell. The bed may be placed in by any of a variety of techniques which are well known to those skilled in the art to achieve a level, uniform bed of an acceptable packing density. After the sorbent has been placed within the canister shell 12, the second retention filter 38 is then placed over the sorbent bed. At this time the parts are now ready to be finally assembled together and a bead of sealing compound 62 is placed on the lower ramp surface 30 of the V-shaped groove in the axially extending peripheral portion 26 of the canister cover 14. The cover is now placed within the open end of the canister shell and, acting through the second plate 42, bears against the second retention filter 38 and the material within the sorbent bed 34 to place it under compression. To this end, an axial force of 40 to 50 pounds is applied to the cover (in a design configuration having a diameter of approximately 5 inches) to maintain the sorbent bed under compression and, at the same time, to cause the unsupported central portion of the first resilient perforated plate to be bowed downwardly, as viewed in FIG. 2, to resiliently stress the perforated plate 40. While this force is being applied, the parts will be sealed together. To this end, a first roller (not shown) is run around the upper periphery of the assembly to force the annular edge portion 32 into the V-shaped groove until it attains the position illustrated in FIG. 5, thus forming a corresponding radially inwardly extending V-shaped surface 64 which is in intimate contact with the V-shaped groove in the peripheral portion of the cover to the extent permitted by the sealing compound 62. To complete the assembly operation another roller is rolled around the upper periphery of the assembly to force the terminal edge 54 into contact with a radiused upper edge 66 of the peripheral portion 26 of the canister cover while the surface 64 is maintained in contact with the V-shaped groove. The process outlined above provides a good mechanical and hermetic seal between the canister shell and the canister cover. It also causes the first resilient perforated plate 40 to maintain the sorbent bed 34 under compression after the compressive force to the cover 14 is released.

What is claimed is:

1. A method of assembling a sorbent type filter assembly comprising the following steps:

providing a canister shell having an inlet passageway in an end portion, a generally cylindrical portion, and a step between the end portion and the cylindrical portion;

inserting into said canister shell a first resilient perforated plate, a first retention filter, a relatively uniform sorbent bed, a second retention filter, and a second resilient perforated plate in the order listed, at least said sorbent bed and said retention filters extending to the periphery of the generally cylindrical portion and being generally planar when assembled, said first resilient perforated plate being supported by said step;

inserting a canister cover into said canister shell, said canister cover having an outlet passageway therein and a peripheral portion having a circumferentially extending groove on an exterior surface, the external diameter of the peripheral portion being substantially the same as the internal diameter of the generally cylindrical portion of the canister shell;

exerting a generally axial force onto said canister cover to place the sorbent bed under compression and to stress the first resilient perforated plate within its elastic limits; and joining the parts together while said force is being exerted onto said canister cover by progressively forcing a portion of the cylindrical portion of the canister shell into said groove, whereby the sorbent bed is maintained under sufficient bed compression to maintain bed integrity in discriminating sorbent-/gas systems subject to rough handling.

2. The method as set forth in claim 1 wherein a particulate filter is inserted into said canister shell prior to the insertion of the first resilient perforated plate, said first resilient perforated plate when resiliently stressed contacting and forcing the peripheral edge of the particulate filter into firm engagement with said step.

3. The method as set forth in claim 1 wherein the canister cover is provided with a radiused edge, and wherein the upper edge of the cylindrical portion of the canister shell is progressively rolled about the radiused edge of the canister cover while the portion previously rolled into the groove is maintained within said groove.

4. The method as set forth in claim 1 wherein the canister cover is provided with an internal annular recess, wherein the second resilient perforated plate is initially force fit into said annular recess, and wherein the second resilient perforated plate and the canister cover are inserted together into said canister shell.

5. A method of assembling a canister cover onto a canister shell to form a canister assembly comprising the following steps:

provising a canister shell having an annular edge portion, and providing a canister cover having an axially extending peripheral portion having therein a circumferentially extending V-shaped groove having upper and lower ramps;

applying sealing compound initially only to said lower ramp;

disposing the canister cover within the canister shell with the upper edge of the peripheral portion preferably being located slightly below the terminal edge of the annular edge portion of the canister shell; and progressively rolling the annular edge portion of the canister shell into said V-shaped groove to form a hermetic and mechanical seal.

6. The method as set forth in claim 5 wherein the peripheral portion of said canister cover is provided with a radiused upper edge.

7. The method of assembly as set forth in claim 6 further characterized by the additional step of progressively rolling the terminal edge about said radiused upper edge of the peripheral portion while maintaining the annular edge portion in said groove.

8. A method of assembling a sorbent type filter assembly comprising the following steps:

providing a canister shell having an inlet passageway in one end portion, a generally cylindrical portion, and a step between said end portion and said generally cylindrical portion;

inserting into said canister shell a first resilient perforated plate, a first retention filter, a relatively uniform sorbent bed, and a second retention filter in the order listed, said retention filters and said sorbent bed extending to the periphery of the generally cylindrical portion, the periphery of the first resilient perforated plate being supported by said step;

providing a canister cover having a central portion provided with an outlet passageway therein and an axially extending peripheral portion having therein a circumferentially extending V-shaped groove having upper and lower ramps, the external diameter of the peripheral portion being substantially the same as the internal diameter of the generally cylindrical portion of the canister shell, and said peripheral portion further being provided with an internal annular recess;

force fitting a second resilient perforated plate into said annular recess;

applying sealing compound to said lower ramp;

inserting the canister cover and said second resilient perforated plate into the canister shell;

applying a compressive force to said canister cover to place the sorbent bed under compression and to resiliently stress the first resilient plate; and rolling a portion of the cylindrical portion of the canister shell into said V-shaped groove to form a hermetic and mechanical seal while the first resilient plate is spring loaded, whereby the sorbent bed is maintained under sufficient bed compression to maintain bed integrity in discriminating sorbent-/gas systems subject to rough handling.

9. The method as set forth in claim 8 further characterized by the step of inserting a particulate filter into said canister shell prior to the insertion of the first resilient perforated plate, said first resilient perforated plate when resiliently stressed contacting and forcing the peripheral edge of the particulate filter into firm engagement with said step.

10. The method set forth in claim 8 wherein the peripheral portion of said canister cover is provided with a radiused upper edge, and further characterized by the additional step of progressively rolling the terminal edge of the generally cylindrical portion about said radiused upper edge while maintaining the annular edge portion in said groove.

11. A sorbent type filter assembly for a respirator comprising:

a canister shell having a generally cylindrical portion and an end portion provided with an inlet passageway therein;

a sorbent bed disposed within said generally cylindrical portion;

retention means for retaining the sorbent bed in the canister shell, the retention means including a pair of oppositely disposed retention filters disposed adjacent the sorbent bed and a pair of oppositely disposed resilient perforated plates in intimate contact with surfaces of said pair of retention filters, one of said resilient plates being resiliently stressed in such a manner that it causes said retention means to maintain said sorbent bed in sufficient bed compression to maintain bed integrity in discriminating sorbent/gas systems subject to rough handling; and a canister cover which encloses the sorbent bed within said canister shell, said canister cover being provided with an outlet passageway therein and a peripheral surface in sealed engagement with the generally cylindrical portion.

12. The sorbent type filter assembly as set forth in claim 11 wherein said canister shell is provided with a step between the generally cylindrical portion and the end portion, the periphery of the resiliently stressed perforated plate being in contact with said step and wherein said canister cover is mounted in intimate contact with the other perforated plate to cause it to be maintained in a generally planar condition.

13. The sorbent type filter assembly as set forth in claim 11 wherein said outlet passagewCay is internally threaded and further characterized by the provision of a gasket which is disposed within the outlet passageway for insuring a proper seal between the canister cover and an externally threaded inlet fitting of a respiratory device.

14. A sorbent type filter assembly for a respirator comprising:

a canister shell having a domed end portion provided with an inlet passageway therein, and a generally cylindrical portion terminating in an annular edge portion, there being a step between the end portion and the cylindrical portion;

a sorbent bed disposed within said generally cylindrical portion;

retention means for retaining the sorbent bed in the canister shell, the retention means including oppositely disposed first and second retention filters disposed adjacent the sorbent bed, and oppositely disposed first and second resilient perforated plates in intimate contact with surfaces of said first and second retention filters, respectively, said first resilient plate being resiliently stressed in such a manner that it resiliently biases said first retention filter into compressive engagement with said sorbent bed to maintain said sorbent bed in sufficient bed compression to maintain bed integrity in discriminating sorbent/gas systems subject to rough handling, the peripheral portion of said first resilient plate being disposed adjacent said step; and a canister overlying against said second resilient perforated plate and maintaining it in a generally planar condition, the canister cover having an outlet passageway therein and a peripheral portion secured to the annular end portion of said shell, the external diameter of the canister cover being substantially the same as the internal diameter of the generally cylindrical portion of the canister shell, said canister cover further being provided with an internal annular groove which receives the peripheral edge of the second perforated plate.

15. The sorbent type filter assembly as set forth in claim 14 further characterized by the provision of a particulate filter held in place between said step and the peripheral portion of said first resilient plate.

16. A sorbent type filter assembly for a respirator comprising:

a canister cover having an outlet passageway therein and an axially extending peripheral portion having therein a circumferentially extending V-shaped groove having upper and lower ramps, the peripheral portion also being provided with a radiused upper edge;

sealing compound covering at least the lower ramp;

a canister shell having a domed end portion provided with an inlet passageway therein and a generally cylindrical portion having an annular edge portion in sealing engagement with said canister cover, said annular edge portion having a radially inwardly extending V-shaped peripheral surface disposed slightly away from the terminal edge of said edge portion, said V-shaped peripheral surface being in intimate contact with said V-shaped groove and said sealing compound, and the terminal edge of said edge portion being in intimate contact with the radiused upper edge of said canister cover;

a sorbent bed disposed within said generally cylindrical portion; and retention means for retaining the sorbent bed in the canister shell, the retention means including oppositely disposed first and second retention filter disposed adjacent the sorbent bed, and oppositely disposed first and second resilient perforated plates in intimate contact with surfaces of said first and second retention filters, respectively, said first resilient plate being resiliently stressed in such a manner that it resiliently biases said first retention filter into compressive engagement with said sorbent bed to maintain said sorbent bed in sufficient bed compression to maintain bed integrity in discriminating sorbent/gas systems subject to rough handling, the peripheral portion of said first resilient plate being disposed adjacent said step, and the second resilient perforated plate and the cover being in juxtaposition.

* * * * *